United States Patent
Sasaki et al.

(10) Patent No.: US 6,434,623 B1
(45) Date of Patent: *Aug. 13, 2002

(54) DATA TRANSMISSION AND DATA RECEIVING APPARATUS THAT OBTAINS FILE DIFFERENCES DURING TRANSMISSION

(75) Inventors: Kenichi Sasaki; Tatsuro Matsumoto; Takayuki Hasebe, all of Kawasaki; Hiroaki Kato, Tokyo; Morito Yamamoto, Tokyo; Takashi Matsushima, Tokyo, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/819,709

(22) Filed: Mar. 18, 1997

(30) Foreign Application Priority Data

Nov. 12, 1996 (JP) ............................................. 8-300539

(51) Int. Cl.[7] .............................................. G06F 15/16
(52) U.S. Cl. ....................... 709/232; 709/247; 709/246; 714/748
(58) Field of Search ............................... 709/232, 236, 709/247, 242, 246, 203, 238; 370/394, 477; 707/203; 714/18, 747, 748, 749, 743; 708/203, 204; 711/100

(56) References Cited

U.S. PATENT DOCUMENTS

| | | | | |
|---|---|---|---|---|
| 4,931,984 A | * | 6/1990 | Ny ............................... | 364/900 |
| 4,935,869 A | * | 6/1990 | Yamamoto .................. | 707/202 |
| 5,155,847 A | * | 10/1992 | Kirouac et al. ............. | 709/221 |
| 5,317,415 A | * | 5/1994 | Kinami et al. .............. | 358/425 |
| 5,377,188 A | * | 12/1994 | Seki ............................ | 370/390 |
| 5,426,643 A | * | 6/1995 | Smolinske et al. ......... | 370/105.3 |
| 5,432,798 A | * | 7/1995 | Blair ........................... | 714/748 |
| 5,537,416 A | * | 7/1996 | MacDonald et al. ........ | 714/748 |
| 5,553,083 A | * | 9/1996 | Miller ......................... | 714/748 |
| 5,572,678 A | * | 11/1996 | Homma et al. .............. | 709/227 |
| 5,588,143 A | * | 12/1996 | Stupek, Jr. et al. ......... | 395/500 |
| 5,657,316 A | * | 8/1997 | Nakagaki et al. ........... | 370/394 |
| 5,664,100 A | * | 9/1997 | Miura ......................... | 709/232 |
| 5,677,900 A | * | 10/1997 | Nishida et al. ............... | 369/48 |
| 5,680,322 A | * | 10/1997 | Shinoda ....................... | 714/18 |
| 5,727,002 A | * | 3/1998 | Miller et al. ................. | 714/748 |
| 5,734,822 A | * | 3/1998 | Houha et al. ............... | 709/230 |
| 5,751,719 A | * | 5/1998 | Chen et al. .................. | 370/473 |
| 5,754,754 A | * | 5/1998 | Dudley et al. ................ | 714/18 |
| 5,761,405 A | * | 6/1998 | Tadamura et al. ............ | 714/18 |

(List continued on next page.)

*Primary Examiner*—Mark H. Rinehart
*Assistant Examiner*—William C. Vaughn, Jr.
(74) *Attorney, Agent, or Firm*—Staas & Halsey LLP (57) ABSTRACT

A data file recording medium stores data files which are an object of transmission and reception. A data file includes data, information as to data volume of the data, and a program having a data volume comparison processing and a data integration processing. The program may include additionally a data expanding processing, in the event that the data is a compression format of data. Such a data file is transferred between a data transmission apparatus and a data receiving apparatus. At the receiving end, a data volume comparison processing is effected to compare data volume as to received data of the data to be transmitted with data volume represented by the data volume information. If the data is in short supply, an amount of missing data is informed to the data transmission apparatus. The data transmission apparatus transmits a data file including data involved in only the missed out portion. At the receiving end, the received data of a plurality of data files are integrated through a data integration processing.

4 Claims, 6 Drawing Sheets

U.S. PATENT DOCUMENTS

| | | | |
|---|---|---|---|
| 5,761,438 A | * 6/1998 | Sasaki | 709/247 |
| 5,764,395 A | * 6/1998 | Iwata | 359/172 |
| 5,768,528 A | * 6/1998 | Stumm | 709/231 |
| 5,774,455 A | * 6/1998 | Kawase et al. | 370/232 |
| 5,778,142 A | * 7/1998 | Tiara et al. | 386/97 |
| 5,805,822 A | * 9/1998 | Long et al. | 709/232 |
| 5,832,520 A | * 11/1998 | Miller | 707/203 |
| 5,873,097 A | * 2/1999 | Harris et al. | 707/203 |
| 5,894,585 A | * 4/1999 | Inoue et al. | 395/827 |
| 5,905,866 A | * 5/1999 | Nakabayashi et al. | 709/223 |
| 5,928,330 A | * 7/1999 | Goetz et al. | 709/231 |
| 6,052,380 A | * 4/2000 | Bell | 370/445 |

* cited by examiner

Page-2

```
ORIGINAL SIZE = 5432100 BYTES

RESIDUAL DATA SIZE = 1975311 BYTES

SAVE THIS DATA WITH FILE NAME "ABC01"

[DOWNLOAD START]
```

DATA TRANSMISSION AND DATA RECEIVING APPARATUS THAT OBTAINS FILE DIFFERENCES DURING TRANSMISSION

BACKGROUND OF THE INVENTION

1. Field of the Invention

The present invention relates to a data transmission apparatus and a data receiving apparatus. The data transmission apparatus and the data receiving apparatus are connected to each other through a communication line, and a data file recording medium for storing data files which are objects of transmission and reception.

2. Description of the Related Art

Recently, as computer and communication technologies advance, it has been known that a client accesses to a large amount of information stored in a server to retrieve information of interest from a large amount of information. This is done so that the information of interest can be obtained via various types of networks such as a telephone line and a LAN. As recent multimedia technology develops, information as an object of communication is directed to a so-called hypertext including a still picture, a dynamic picture image or animation, sound and the like, in addition to text information, and thus nowadays the size of a data file is increasingly bigger. As a result, there is a need to take more time for the transfer of a data file, and also there is a tendency that an occupation ratio of a communication channel per user, in a communication network is increased. Therefore, there is a fear that the transfer rate will be decreased.

In such a situation, the transfer of a data file is not always successfully completed in accordance with the load conditions of a network. As a result, part of the latter half of the data file is missed due to a time-out during the transfer.

In such a case, an operator makes a fresh start with respect to the transmission of a data file. This causes the load of a network to be more increased. Therefore, it takes more time to complete the transmission of a data file.

On the other hand, from the viewpoint of a data transfer, it is thought that a data file is stored in a storage medium, such as a floppy disk and the like, and such a floppy disk is delivered. However, the data file is not transmitted through the network. In this case, as compared with the case of a transmission through a network, there arises such a problem that a lot of time or labor is required for the delivery of floppy disks or the like. Further, in the event that the data stored in the floppy disks or the like, is missing a part of the data, it will be difficult to promptly take measures. Thus, there is a fear that a user has to wait several days to obtain the data of interest, by means of again delivering the floppy disks or the like.

SUMMARY OF THE INVENTION

In view of the foregoing, it is therefore an object of the present invention to provide a data transmission apparatus, a data receiving apparatus and a data file recording medium, which are capable of, even in the event that when a data file is transferred through a communication channel and data loss occurs, minimizing a load of the communication channel and also promptly restoring the missing data.

To achieve the above-mentioned object, according to the present invention, there is a data transmission apparatus in data communication systems having the data transmission apparatus for transmitting data through a communication channel and data receiving apparatuses for receiving data transmitted through the communication channel. The data transmission apparatus and the data receiving apparatuses are connected to each other through the communication channel. The data transmission apparatus comprises:

(1-1) a first file transmission means for transmitting to a data receiving apparatus, a data file including data and information as to the volume of data;

(1-2) a data file generating means for generating, upon receiving notice of the first volume of data received by the data receiving apparatus, which relates to the data file transmitted from the data transmission apparatus, from the data receiving apparatus, or notice of a shortage data volume represented by a difference between the first data volume and the second data volume indicated by data volume information of the data file, a new data file including a shortage data portion, which is not received by the data receiving apparatus, of the data file, and position information included in the data file, said position information being associated with the shortage data portion; and (1-3) a second file transmission means responsive to the generation of the new data file by the data file generating means for transmitting the new data file generated by said data file generating means to the data receiving apparatus which has issued notices of the first data volume or shortage data volume.

In the above-mentioned data transmission apparatus, it is preferable that said first file transmission means (1-1) transmits the data file including data, information relating to the volume of data, and a program. This program is operated in the data receiving apparatus and adapted to execute a data volume comparison processing in which the first data volume of the received data is evaluated. In addition, the first data volume is compared with the second data volume which indicates the data volume information. A data integration processing in which the received data in the new data file, which is transmitted from the data transmission apparatus in response to notices of the first data volume or the shortage of the data volume issued from the data receiving apparatus is integrated with the received data in the data file received earlier.

In this case, it is preferable that each of the first file transmission means and the second file transmission means transmit a data file including a compression format of data. The first file transmission means transmits the data file including a program operated in the data receiving apparatus and is adapted to execute a data expanding processing in which the received data are expanded, in addition to execution of the data volume comparison processing and the data integration processing.

To obtain the above-mentioned object, the present invention provides a data receiving apparatus in a data communication systems having a data transmission apparatus for transmitting data through a communication channel and a data receiving apparatuses for receiving data transmitted through the communication channel. The data transmission apparatus and the data receiving apparatuses are connected to each other through the communication channel, said data receiving apparatus comprises:

(2-1) a first file receiving means for receiving a data file including data and information as to the volume of data;

(2-2) a data volume comparison means for detecting a first data volume of received data in the data file received by the first file receiving means, and comparing the first data volume with the second data volume indicated by data volume information of the data file;

(2-3) a shortage informing means for informing the transmission apparatus as a transmission source of the data file, in the event that the first data volume is less than the second data volume, of the first data volume or a shortage data volume represented by a difference between the first data volume and the second data volume;

(2-4) a second file receiving means for receiving a new data file including a shortage data portion, which is not received by said first file receiving means, of data in the data file, transmitted from the data transmission apparatus in response to notices of the first data volume or shortage data volume by said shortage informing means, and position information included in the data file, said position information being associated with the shortage data portion; and (2-5) a data integration means for integrating the received data in the data file received by the said first file receiving means with the received data in the data file received by the said second file receiving means.

In the above-mentioned data receiving apparatus, it is preferable that said first file receiving means (2-1) receives the data file including data, information as to the volume of data, and a program, said program being operated in the data receiving apparatus and adapted to execute a data volume comparison processing in which the first data volume of the received data is evaluated and the first data volume is compared with the second data volume indicated by the data volume information, and a data integration processing in which the received data in the data file received by the said first file receiving means is integrated with the received data in the data file received by the said second file receiving means;

said data volume comparison means (2-2) is implemented by means of executing the data volume comparison processing of the program in the data file received by said first file receiving means; and said data integration means (2-5) is implemented by means of executing the data integration processing of the program in the data file received by said first file receiving means.

Further, in the above-mentioned data receiving apparatus, it is preferable that each of said first file receiving means (2-1) and said second file receiving means (2-2) receives a data file including a compression format of data; and said data receiving apparatus further comprises a data expanding means (2-6) for expanding the compression format of data in each of the data files received by said first file receiving means and said second file receiving means.

In this case, it is preferable that said first file receiving means receives the data file including data, information as to the volume of data, and a program, said program being operative in the data receiving apparatus and adapted to execute a data volume comparison processing in which the first data volume of the received data is evaluated and the first data volume is compared with the second data volume indicated by the data volume information, a data integration processing in which the received data in the data file received by the first file receiving means is integrated with the received data in the data file received by the said second file receiving means, and a data expanding processing in which a compression format of data is expanded;

said data volume comparison means (2-2) is implemented by means of executing the data volume comparison processing of the program in the data file received by said first file receiving means;

said data integration means (2-5) is implemented by means of executing the data integration processing of the program in the data file received by said first file receiving means; and said data expanding means (2-6) is implemented by means of executing the data expanding processing of the program in the data file received by said first file receiving means.

To achieve the above-mentioned object, the present invention provides a data file recording medium for storing data files which are an object of transmission and reception by once in data communication systems having data transmission apparatuses for transmitting data through a communication channel and data receiving apparatuses for receiving data transmitted through the communication channel, said data transmission apparatuses and said data receiving apparatuses are connected to each other through the communication channel, wherein said data file recording medium stores the data file including:

(3-1) data;

(3-2) data volume information of the data; and (3-3) a program operative in a data receiving apparatus and adapted to execute a data volume comparison processing in which a first data volume of the received data in the data file received by the data receiving apparatus is evaluated and the first data volume is compared with a second data volume indicated by the data volume information, and a data integration processing in which the received data in the data file is integrated with received data in a new data file including a shortage data portion, which is not received by the data receiving apparatus, of data in the data file, transmitted from the data transmission apparatus in response to notices of the first data volume or shortage data volume represented by a difference between the first data volume and the second data volume, issued from the data receiving apparatus to the data transmission apparatus, and position information included in the data file, said position information being associated with the shortage data portion.

In the above-mentioned data file recording medium, it is preferable that at least part of data of the data file stored in said data file recording medium is a compression format of data, and the program of the data file stored in said data file recording medium includes a data expanding processing in which the compression format of data is expanded.

DESCRIPTION OF THE PREFERRED EMBODIMENTS

Hereinafter, there will be a description of the embodiments of the present invention.

First, there will be a description of an embodiment useful for understanding a principle of the invention referring to a basic arrangement of the present invention. Then there will be description of a specific embodiment of the present invention.

Figure 1:
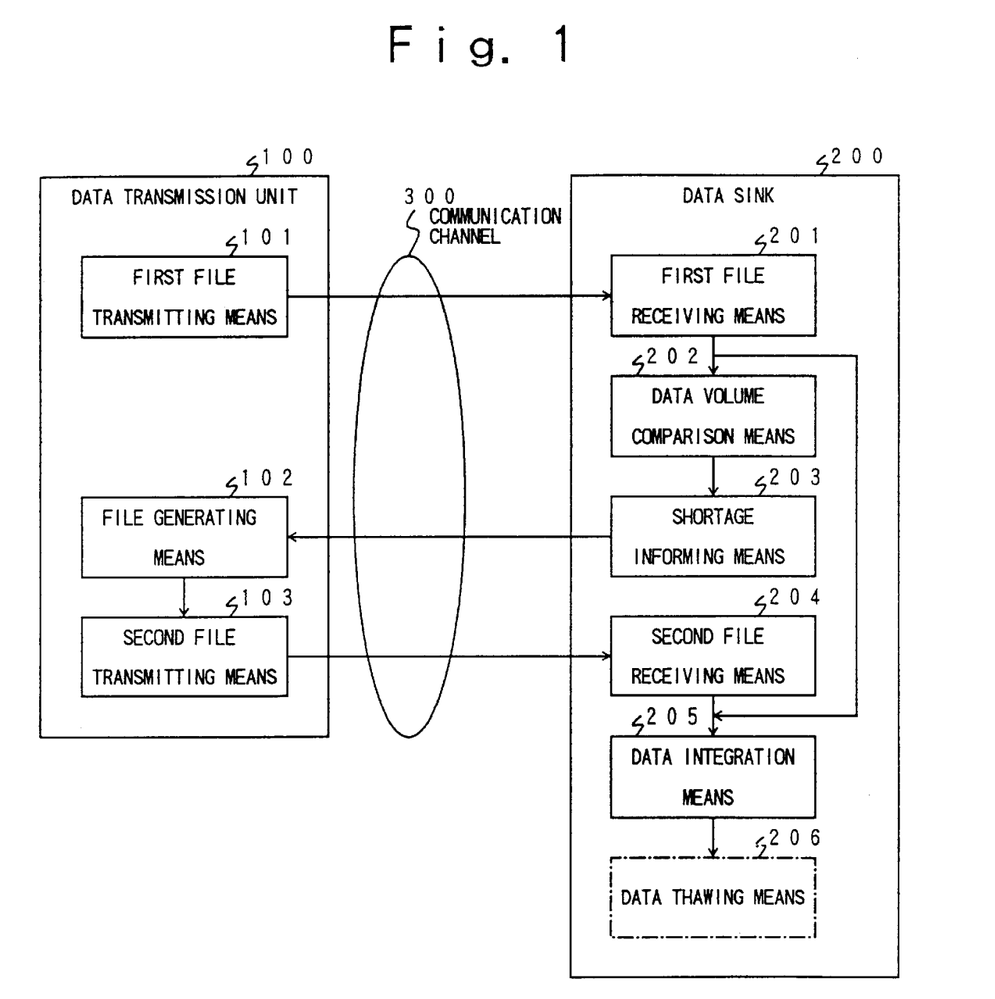
FIG. 1 is a schematic diagram showing an internal structure of a data transmission unit and a data sink coupled with each other through a communication channel.

FIG. 1 is a schematic diagram showing the internal structure of a data transmission unit and a data sink coupled with each other through a communication channel.

A data communication system, as shown in FIG. 1, comprises a data transmission unit 100 for transmitting data via a communication channel 300, a data sink 200 for receiving data transmitted via the communication channel 300, and the communication channel 300 for connecting the data transmission unit 100 with the data sink 200.

The data transmission unit 100 comprises a first file transmitting means 101, a file generating means 102 and a second file transmitting means 103. According to the present embodiment, the above-mentioned respective means are distinguished from one another in accordance with their functions. However, it is acceptable that the first file transmitting means 101 and the second file transmitting means 103 are integrated in the form of a single transmission unit, for example, a single transmission port, a single transmission program and the like.

The data sink 200 comprises a first file receiving means 201, a data volume comparison means 202, a shortage informing means 203, a second file receiving means 204, and a data integration means 205. It is acceptable that the data sink 200 further comprises a data thawing means 206, in view of a data format of a data file transmitted from the data transmission unit 100.

Also, with respect to the data sink 200, it is acceptable that the first file receiving means 201 and the second file receiving means 204 are integrated in the form of a single reception unit, for example, a single reception port, a single reception program and the like. It is also acceptable that the first file receiving means 201, the second file receiving means 204 and in addition the shortage informing means 203 are integrated in the form of a single communication port, a single communication program or the like.

The function of each of means 201 to 206 containing the data sink 200 will be described later.

Figure 2:
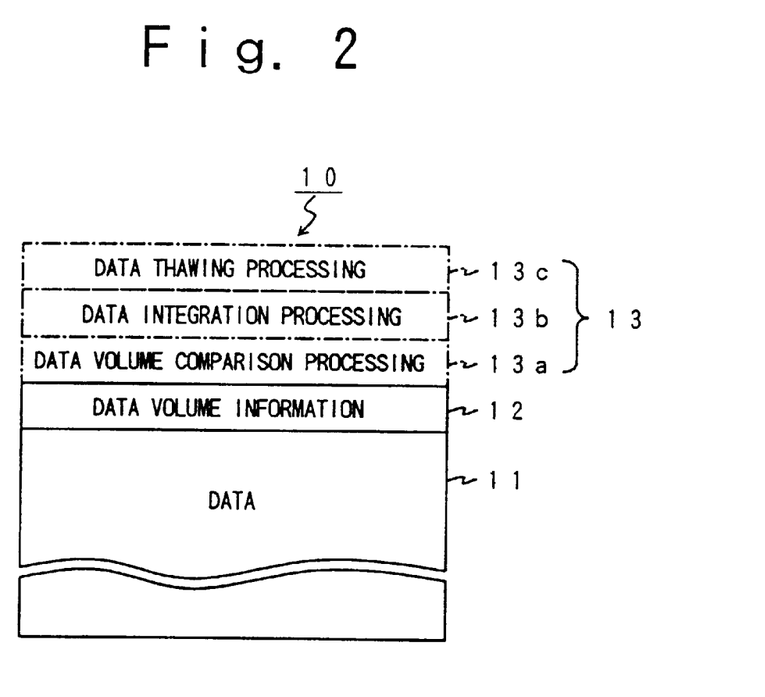
FIG. 2 is a diagram showing a file structure of a data file as an object of a transmission in the first file transmitting means.

FIG. 2 is a diagram showing the file structure of a data file as an object of a transmission in the first file transmitting means 101.

A data file 10 includes data 11 including information to be transmitted essentially, and data volume information 12 representative of a data volume of the data 11. It is preferable that the data file 10 includes a program 13, details of which will be described later.

The first file transmitting means 101 of the data transmission unit 100, as shown in FIG. 1, sends the data file having the file structure, as shown in FIG. 2, to the data sink 200, as shown in FIG. 1.

In the data sink 200, as shown in FIG. 1, the first file receiving means 201 receives the data file having the file structure, as shown in FIG. 2. The data volume comparison means 202 determines a first data volume, which is representative of the amount of data actually received of the data file received by the first file receiving means 201, and compares the first data volume with a second data volume represented by the data volume information of the data file.

As a result of comparing the data volumes by the data volume comparison means 202, in the event that the first data volume is less than the second data volume, the shortage informing means 203 informs the data transmission unit 100 as a transmission source of the data file of the first data volume or a shortage data volume indicating a difference between the first data volume and the second data volume.

In the data transmission unit 100, upon receipt of a notice of the first data volume or the shortage data volume, the file generating means 102 produces a new data file including a shortage data portion, which is not received by the data sink 200 of the data in the data file transmitted from said first file transmitting means 101, and position information in the data file transmitted, which is associated with the shortage data portion. In the event that the data transmission unit 100 receives a notice of the first data volume, it is possible to know the shortage data portion by means of determining a difference between the first data volume noticed and the data volume (the second data volume) in the original data file in the data transmission unit 100.

Figure 3:
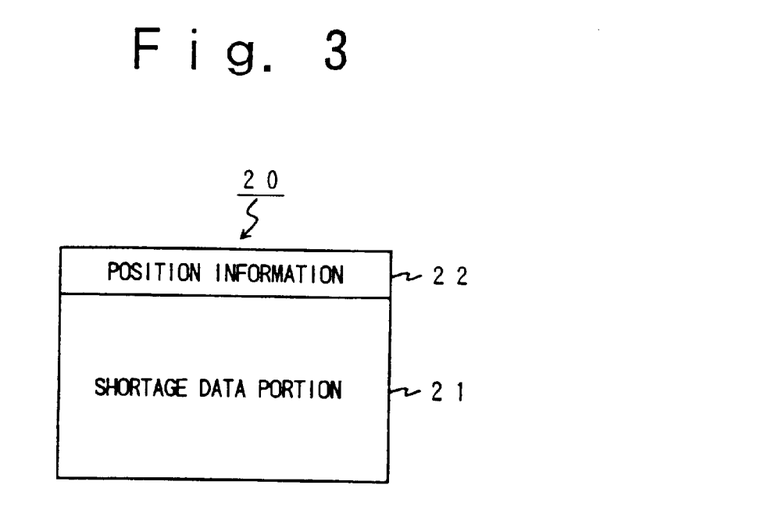
FIG. 3 is a diagram showing a file structure of a new data file generated by the file generating means.

FIG. 3 is a diagram showing the file structure of a new data file generated by the file generating means 102.

The new data file includes a shortage data portion 21, which is not received by the data sink 200 of the data 11 in the data file, as shown in FIG. 2, and position information 22 representative of what position in the data file, as shown in FIG. 2, the shortage data portion 21 is associated with.

In the data transmission unit 100, when the file generating means 102 generates the new data file 20 as shown in FIG. 3, the second file transmitting means 103 sends the new data file 20 generated by the file generating means 102 to the data sink 200 which issued a notice of shortage data volume.

The second file receiving means 204 of the data sink 200 receives the new data file 20 as shown in FIG. 3, which is transmitted from the second file transmitting means 103, and transfers to the data integration means 205 the same together with the data file in which a part of data received by the first file receiving means 201 is missing. The data integration means 205 integrates the received data of the data file received by the first file receiving means 201 with the received data of the data file received by the second file receiving means 204. That is, the data missing portion of the data file in which a part of data received by the first file receiving means 201 is missing is supplemented with the data of the new data file received by the second file receiving means 204, so that data free from missing parts can be produced in its entirety.

In the event that the data 11 (cf. FIG. 2) of the data file transmitted from the first file transmitting means 101 of the data transmission unit 100 and received by the first file receiving means 201 of the data sink 200, and the data (shortage data portion) 21 (cf. FIG. 3) of the data file transmitted from the second file transmitting means 103 of the data transmission unit 100 and received by the second file receiving means 204 of the data sink 200 are data of a compression format. The data sink 200 is provided with a data expanding means 206 for expanding the data integrated by the data integration means 205.

Transmission of data of a compression format contributes to a reduction of communication time thereby easing congestion on the communication channel 300.

The above-mentioned procedure permits, when data is missing, to retransmit only the missed data. Thus, it is possible to avoid the situation that the communication channel is occupied unnecessarily, and also it minimizes the time required for recovering the missed data, thereby finally receiving the complete data.

It is preferable that the data file transmitted from the first file transmitting means 101 of the data transmission unit 100 and received by the first file receiving means 201 of the data sink 200 includes, as shown in FIG. 2, in addition to the data 11 and the data volume information 12, a program 13 for executing a data volume comparison processing 13a and a data integration processing 13b. Further, in the event that the above-mentioned compressed type of data is communicated, it is preferable that the program 13 executes a data expanding processing 13c.

The data volume comparison processing 13a in the program 13 is a processing in which a data volume (the first data volume) of data received by the data sink 200 is compared with a data volume (the second data volume) represented by the data volume information 12 (cf. FIG. 2). The data integration processing 13b the program 13 is a processing in which the missing data portion of the data file received by the first file receiving means 201 is supplemented with the data of the data file received by the second file receiving means 204, so that data free from loss can be produced in its entirety. The data expanding processing 13c is a process in which in the event that the data of the data file received by the data sink 200 is a compressed type of data, the compressed type of data is expanded.

In the event that the data file transmitted from the first file transmitting means 101 of the data transmission unit 100 and received by the first file receiving means 201 of the data sink 200 is a data file including the program 13, as shown in FIG. 2, the data volume comparison means 202, the data integration means 205 and the data expanding means 206, which constitute the data sink 200, as shown in FIG. 1, are implemented by means of executing the data volume comparison processing 13a, the data integration processing 13b and the data expanding processing 13c of the program 13 in the data file received by the first file receiving means 201 of the data sink 200, respectively.

In this manner, included in the data file programs for executing the data volume comparison processing and the data integration processing involved in reception of the shortage data portion, and including into the data file an additional program for executing the data expanding processing in case of transmission of the compressed type of data make it possible to omit a need for previously providing means for the data volume comparison and data integration, or means for the data expanding at the data sink 200 end, thereby providing more flexible communication systems.

Figure 4:
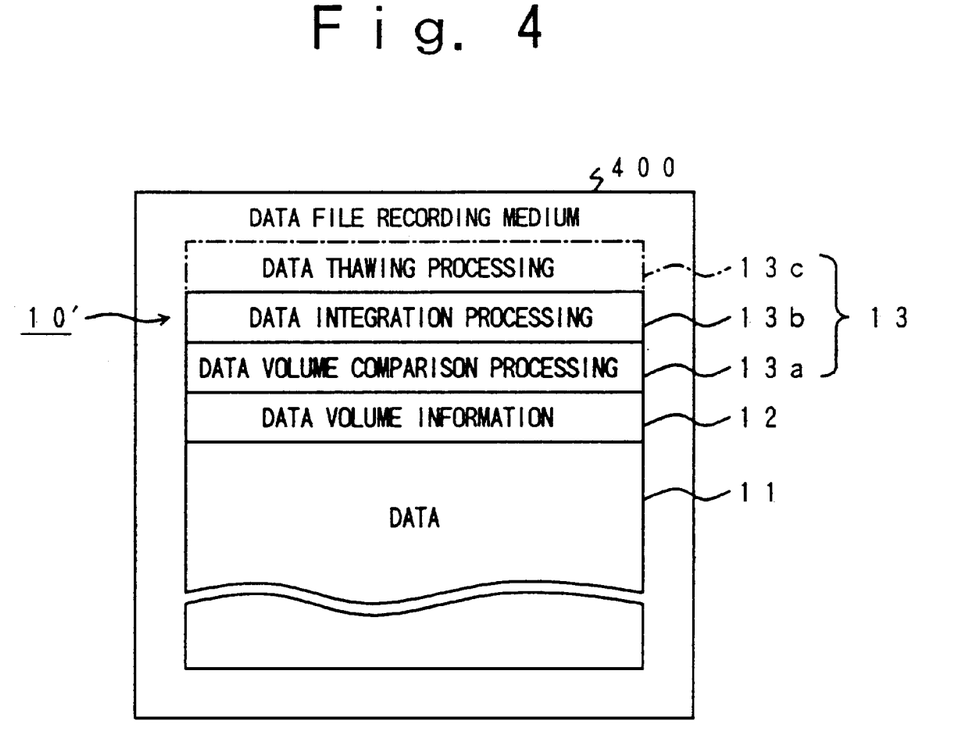
FIG. 4 is a diagram showing a file structure of a data file stored in a data file recording medium disclosed as one embodiment of the present invention.

FIG. 4 is a diagram showing a file structure of a data file stored in a data file recording medium disclosed as one embodiment of the present invention.

The data file recording medium 400 stores a data file 10' of a format similar to the data file 10, as shown in FIG. 2.

Specifically, the data file 10' includes data 11 including information to be transmitted essentially, the data volume information 12 representative of a data volume of the data 11, and the program 13 for executing the data volume comparison processing 13a and the data integration processing 13b. Further, in the event that the data 11 is a compressed type of data, the program 13 executes also the data expanding processing 13c. The processing contents of the data volume comparison processing 13a, the data integration processing 13b, and the data expanding processing 13c are the same as those of the data volume comparison processing, the data integration processing, and the data expanding processing explained referring to FIG. 2. Thus, redundant explanations will be omitted.

The data file recording medium 400 may be provided at either of the data transmission unit 100 shown in FIG. 1, the data sink 200 and another unit different from those units. It is acceptable that the data file recording medium 400 is a portable type of recording medium, for example, a floppy disk, a CD, a MO and the like. The data file recording medium 400, as shown in FIG. 4, is a typical example of those mediums. Specifically, the data file 10' shown in FIG. 4 is produced by the third unit referred to as a data producing unit, which is different from the data transmission unit 100 shown in FIG. 1 and the data sink 200, and is once stored in a data file recording medium of the third unit (at this point the data file recording medium of the third unit corresponds to the data file recording medium 400 shown in FIG. 4); then the data file 10' stored in the data file recording medium of the third unit is transferred to a portable type of data file recording medium (at this point the portable type of a data file recording medium corresponds to the data file recording medium 400 shown in FIG. 4); the data file 10' stored in the portable type of data file recording medium is transferred to a data file recording medium in a data transmission unit so as to be managed (at this time point the data file recording medium in the data transmission unit corresponds to the data file recording medium 400 shown in FIG. 4); and the data file 10' stored in the data file recording medium in the data transmission unit is transferred to a data sink and temporarily stored in a data file recording medium in the data sink (at this time point the data file recording medium in the data sink corresponds to the data file recording medium 400 shown in FIG. 4).

A provision of the data file recording medium 400 shown in FIG. 4 makes it possible to perform smoothly transmission and reception of data and also to transmit data free from loss keeping congestion of the communication channel to a minimum.

Figure 5:
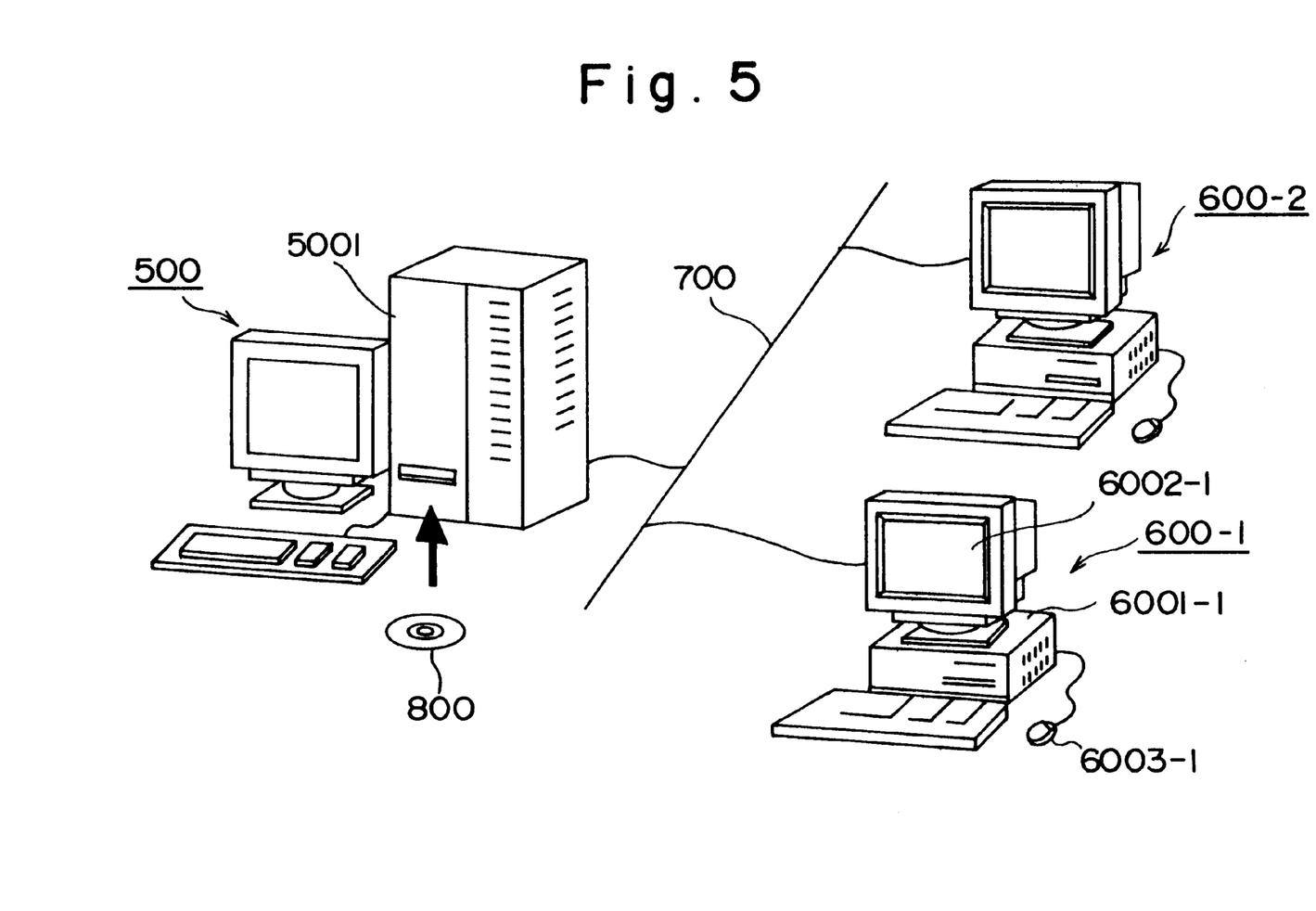
FIG. 5 is a typical illustration of a server/client communication system according to one embodiment of the present invention.

FIG. 5 is a typical illustration of a server/client communication system according to one embodiment of the present invention.

FIG. 5 shows a server/client communication system comprising a server 500 and a plurality of clients 600_1 and 600_2, which are connected with one another through a communication channel 700. Each of the server 500 and the plurality of clients 600_1 and 600_2 is a computer system provided with a communication equipment.

In the server 500, a storage 5001 stores a number of data files. Upon receipt of a transfer request for a data file for a certain client (e.g. client 600_1), the data file, which meets the request, is retrieved from among a number of data files stored in the storage 5001, and the retrieved data file is transmitted via the communication channel 700 to the client 600_1 who made the transfer request. The client 600_1 receives the data file transmitted and displays the same on a display screen 6002_1.

In the event that a new data file is additionally stored in the storage 5001 of the server 500, while it is acceptable that the new data file is generated in the server 500, according to the present embodiment, for example, the new data file is generated in the third device not illustrated. The new data file thus generated is stored via a portable recording medium 800 in the storage 5001 of the server 500, so that the new data file becomes an object of the management by the server 500.

Figure 6:
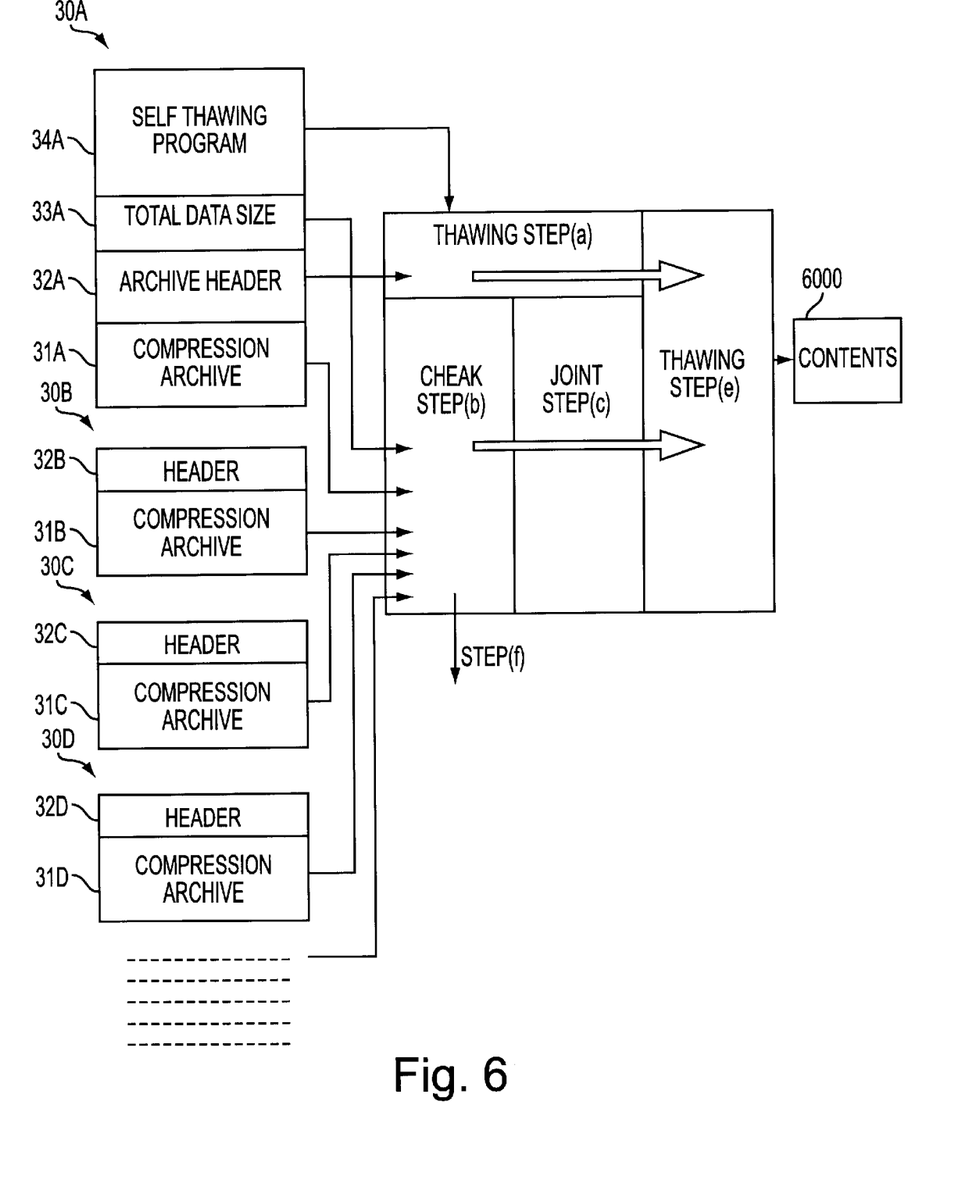
FIG. 6 is a diagram useful for understanding a file structure of a data file to be transmitted from a server to a client and an operation of the client which has received the data file.

FIG. 6 is a diagram useful for understanding a file structure of a data file to be transmitted from a server to a client and an operation of the client which has received the data file.

The server 500 sends to a client (typically, e.g. client 600_1) a data file of the format shown by a data file 30A in FIG. 6.

The data file 30A includes: a compression archive 31A in which data to be essentially transmitted to the client 600_1 is stored in the format of compression; an archive header 32A which is header information of the compression archive 31A; a total data size 33A which is representative of an amount of data of the compression archive 31A; and a self expanding program 34A. The self expanding program 34A includes not only the expanding processing, but also processing for a comparison of data sizes, a request for re-transmission of data and a data integration.

Figure 7:
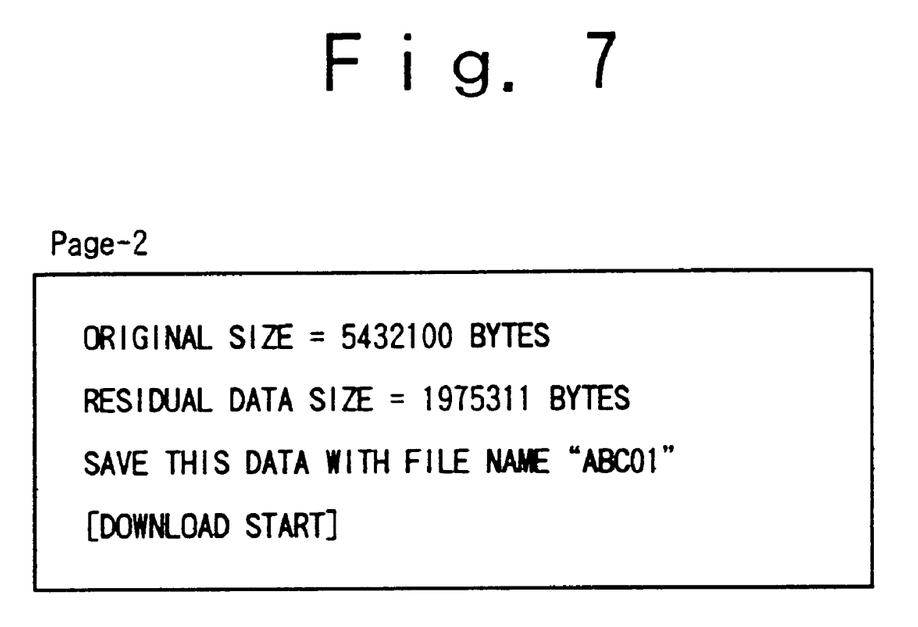
FIG. 7 is an illustration showing a display screen of the client in which data is missing.

The client 600_1 receives the data file 30A transmitted from the server 500. Now, it is assumed that in transmission of the data file, a time-out occurs and the client 600_1 receives the data file in the state that the second half of the compression archive 31 A of the data file 30A is missing. The data file 30A is downloaded into a storage 6001_1 in the client 600_1. When the download is over (including the case of the interruption), the self expanding program 34A starts (step (a)). The self expanding program 34A serves to perform a check as to whether the data size of the first downloaded data (the downloaded portion of the compression archive 31A) matches with the total data size 33A (step (b)). In the event that the data size of the downloaded data is smaller than the total data size 33A, the client 600_1 displays on the display screen 6001_2, as shown in FIG. 7, the total data size (ORIGINAL SIZE) and the missing portion of data size (residual data size). When this screen is displayed, a mouse 6001_3 is operated to click the icon of "Download Start". As a result, the residual data size is informed to the server 500 (step (f)).

Then, the server 500 generates and transmits a data file 30B to the client 600_1. The data file 30B includes: a compression archive 31B comprising a data portion, residing in such a condition that it is not received by the client 600_1 and loss, of the compression archive 31A of the data file 30A; and a header 32B of the compression archive 31B. The header 32B includes position information indicating as to what portion of the compression archive 31A of the data file 30A the compression archive 31B is associated with. When the data file 30B is downloaded into the client 600_1, the self expanding program 34A again starts, so that the position information stored in the header 32B of the data file 30B is referred to in order to check matching of the data. Thus, the data file 30B performs a check as to whether the missing data of the data file 30A has been recovered. In the event that the combination of the received data of the data file 30A and the received data of the data file 30B does not yet satisfy the total data size 33A, the above-mentioned procedure is repeatedly carried out in such a manner that a data file 30C comprising a compression archive 31C, which comprises a still shortage portion of data, and a header 32C of the compression archive 31C, is received, further a data file 30D is received, . . . , and finally data of the data size matched with the total data size 33A is received. Those received data are jointed with one another in accordance with the self expanding program 34A so that the compression archive 31A free from the missing data is constructed (step (c)).

The archive header 32A of the data file 30A is expanded in accordance with the self expanding program 34A, and then the coupled archive header is expanded on the basis of the expanded archive header (step (e)). In this manner, it is possible to derive contents 6000 free from missing data.

According to the above-mentioned server/client system, in the event that a download of the data file involves data loss, there is no need to download again all the data. Accordingly, it is possible to finally provide or obtain inexpensively data free from data loss without uselessly using the communication channel.

Incidentally, according to the embodiment explained referring to FIG. 6, the self expanding program is involved in all the processing of the check, the joint and the expanding. However, it is acceptable that the client end is provided with a part or the whole of those functions, independently of the data file transmitted.

As described above, according to the present invention, it is possible to transmit data free from data loss suppressing an occupation ratio of a communication channel to a minimum and promptly.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A data transmission apparatus in a data communication systems having the data transmission apparatus for transmitting data through a communication channel and data receiving apparatuses receiving data transmitted through the communication channel, said data transmission apparatus and said data receiving apparatuses being connected to each other through the communication channel, said data transmission apparatus comprising:

first file transmission means for transmitting to one of the data receiving apparatuses a data file including data, total volume information of the data, and a program, said program being operative in the data receiving apparatuses and adapted to execute processes comprising:

a data volume comparison processing to compare volume of received data in a data receiving apparatus with the total volume information, responsive to a shortage in the volume of the received data based upon the comparison, to generate a shortage data volume by calculating a difference between the total volume information of the data and the volume of the received data, and with notices to notify the data transmission apparatus of the shortage data volume, and a data integration processing in which a shortage data portion, transmitted from the data transmission apparatus in response to the notices from the data receiving apparatuses, is integrated with the received data using position information of the shortage data portion in the transmitted data;

a shortage data generating means for generating, responsive to the notices, position information of a shortage data portion in the transmitted data by calculating a difference between the total volume information of the data and the shortage data volume from the notices, and generating the shortage data portion based upon the generated position information and having a volume based upon the shortage data volume from the notices; and second file transmission means for transmitting the shortage data portion to a data receiving apparatus which has issued the notices.

2. A data transmission apparatus according to claim 1, wherein each of said first file transmission means and said second file transmission means transmits a data file including a compression format of data, and said first file transmission means transmits the data file including a program operative in the data receiving apparatus and adapted to execute a data expanding processing in which the received data are expanded, in addition to execution of the data volume comparison processing and the data integration processing.

3. A data transmission apparatus in a data communication systems connected to a communication channel for transmitting data through the communication channel and having data receiving apparatuses connected to the communication channel for receiving data transmitted through the communication channel, said data transmission apparatus comprising:

- a first file transmission unit transmitting to the data receiving apparatuses a data file including data, total volume information of the data, and a program, said program being operative in the data receiving apparatuses to execute a data volume comparison process;
- a data shortage generating unit generating a shortage data portion of the data not received by the data receiving apparatuses and position information of the shortage data portion in the data, upon receiving from the data receiving apparatuses, based upon the data volume comparison process executing in the data receiving apparatuses, notices of a shortage data volume represented by a difference between a received data volume indicating volume of data received by the data receiving apparatuses and the total volume information of the data; and
- a second file transmission unit, responsive to generation of the shortage data portion by the shortage data generating unit, transmitting the shortage data portion to the data receiving apparatus which has issued notices of the shortage data volume.

4. A data communication system with data transmission apparatuses communicating via a network to data receiving apparatuses, comprising:

- a storage medium in communication with the data transmission apparatuses and storing a data file including data, total size information of the data, and a program to operate in the data receiving apparatuses to execute a data volume comparison process;
- a file transmission unit in the data transmission apparatuses that transmits the data file to the data receiving apparatuses; and
- a generating unit in the data transmission apparatuses that generates and transmits to the data receiving apparatuses a remaining portion of the data not received by one of the data receiving apparatuses and position information of the remaining portion in the data, upon receiving from the one data receiving apparatus, based upon the data volume comparison process executing in the one data receiving apparatus, notices of a remaining portion volume represented by a difference between a received data volume indicating volume of data received by the one data receiving apparatus and the total size information of the data.

* * * * *